(12) United States Patent
Bastide et al.

(10) Patent No.: US 9,167,009 B2
(45) Date of Patent: Oct. 20, 2015

(54) PRESENTING DATA TO ELECTRONIC MEETING PARTICIPANTS

(75) Inventors: Paul Roger Bastide, Boxford, MA (US); Matthew E. Broomhall, Burlington, VT (US); Robert Edward Loredo, North Miami Beach, FL (US); Michael L. Taylor, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 93 days.

(21) Appl. No.: 13/466,293

(22) Filed: May 8, 2012

(65) Prior Publication Data

US 2013/0305166 A1 Nov. 14, 2013

(51) Int. Cl.
H04L 29/06 (2006.01)

(52) U.S. Cl.
CPC .......... *H04L 65/403* (2013.01); *H04L 65/1069* (2013.01); *H04L 65/4038* (2013.01)

(58) Field of Classification Search
CPC .............. H04L 65/403; H04L 65/1069; H04L 65/4038
USPC ......... 715/753, 716–722, 730, 731, 733–736, 715/740–747; 709/203, 204, 220–224
See application file for complete search history.

(56) References Cited

U.S. PATENT DOCUMENTS

| | | | |
|---|---|---|---|
| 5,594,859 A * | 1/1997 | Palmer et al. ................. | 715/756 |
| 7,599,989 B2 * | 10/2009 | Stevens et al. ................ | 709/204 |
| 8,527,588 B2 * | 9/2013 | Beck et al. .................... | 709/204 |
| 2004/0125133 A1 * | 7/2004 | Pea et al. ....................... | 345/751 |
| 2004/0212731 A1 * | 10/2004 | Sie et al. ........................ | 348/445 |
| 2006/0098112 A1 * | 5/2006 | Kelly ......................... | 348/333.12 |
| 2006/0168532 A1 * | 7/2006 | Stevens et al. ................ | 715/753 |
| 2006/0271624 A1 * | 11/2006 | Lyle et al. ..................... | 709/204 |
| 2010/0269044 A1 * | 10/2010 | Ivanyi et al. .................. | 715/736 |
| 2010/0293226 A1 * | 11/2010 | Beck et al. ..................... | 709/204 |
| 2011/0225247 A1 * | 9/2011 | Anantharaman et al. ..... | 709/206 |
| 2011/0307550 A1 | 12/2011 | Bastide et al. | |
| 2011/0307805 A1 | 12/2011 | Bastide et al. | |
| 2012/0005588 A1 | 1/2012 | Bastide et al. | |
| 2012/0005599 A1 | 1/2012 | Bastide et al. | |
| 2012/0039505 A1 | 2/2012 | Bastide et al. | |
| 2012/0072578 A1 * | 3/2012 | Alam ............................ | 709/224 |
| 2012/0197991 A1 * | 8/2012 | Ramani et al. ................ | 709/204 |
| 2012/0311043 A1 * | 12/2012 | Chen et al. .................... | 709/204 |
| 2013/0159380 A1 * | 6/2013 | Alam et al. .................... | 709/203 |

OTHER PUBLICATIONS

Ledford, Jerri L., and Mary E. Tyler. Google Analytics 2.0. John Wiley & Sons, 2007. Pertinent pp. xii, 3-4, 50, 208-210, 217-218.*

(Continued)

*Primary Examiner* — Ajay Bhatia
*Assistant Examiner* — Justin R Blaufeld
(74) *Attorney, Agent, or Firm* — Schmeiser, Olsen & Watts LLP (57) ABSTRACT

Described are a system and method for presenting web conference contents to one or more attendees in a shared session. Metadata is aggregated that is related to one or more participant electronic devices and a presenter electronic device that communicate with each other in the web conference. A presentation parameter is determined from the metadata. A selection interface is generated from the presentation parameter. A conference setting is selected from the selection interface. A set of content is presented at the presenter electronic device and shared with the one or more participant devices according to the selected conference setting.

8 Claims, 5 Drawing Sheets

(56) References Cited

OTHER PUBLICATIONS

Armando Roggio, "Liquid Layouts Revisited" <http://www.getelastic.com/liquid-layouts-revisited/> (published Apr. 1, 2010) (last accessed May 5, 2015).*

Kris Irizawa, "Screen Resolution—Optimizing Placements of Key Call to Action and Content Layout" <http://www.zoommetrix.com/optimization/screen-resolution-optimizing-placements-of-key-call-to-action-and-content-layout/> (published Mar. 20, 2010) (last accessed May 5, 2015).*

Arthur Blume "Introducing Google Browser Size" <http://googlecode.blogspot.com/2009/12/introducing-google-browser-size.html>, Google (published Dec. 16, 2009) (last accessed, May 5, 2015).*

Non-Final Office Action in related U.S. Appl. No. 13/871,362, mailed on Jun. 8, 2015; 24 pages.

"Aspect Ratio (image)", Wikipedia.org, accessed on Sep. 2, 2005.

* cited by examiner

PRESENTING DATA TO ELECTRONIC MEETING PARTICIPANTS

FIELD OF THE INVENTION

The present invention relates generally to electronic meeting environments.

BACKGROUND

People often attend meetings, web conferences, or related online gatherings. During a typical web conference, a presenter may share a screen with other participants.

BRIEF SUMMARY

In one aspect, provided is a computer-implemented method. The method comprises, for a web conference, aggregating metadata related to one or more participant electronic devices and a presenter electronic device that communicate with each other in the web conference; determining a presentation parameter from the metadata; generating, at a display screen of the presenter electronic device, a selection interface from the presentation parameter; selecting a conference setting from the selection interface; and displaying a set of content presented at the presenter electronic device and shared with the one or more participant devices according to the selected conference setting.

In another aspect, provided is a computer-implemented method, comprising joining a plurality of participant electronic devices at an electronic meeting; aggregating data corresponding to participant electronic devices at the electronic meeting; determining a set of presentation parameters that are conducive to a presentation of data at the participant electronic devices at the electronic meeting; and generating a selection interface in response to determining the set of presentation parameters.

In another aspect, provided is a display adjustment system comprising a data aggregator that combines and processes metadata related to one or more participant electronic devices and a presenter electronic device that communicate with each other in a web conference; a parameter determiner that determines a presentation parameter from the metadata; a selection interface generator that generates a selection interface in response to determining the presentation parameter; and a settings generator that provides a conference setting that can be activated according to the selection interface.

In another aspect, provided is a computer program product comprising a computer readable storage medium having computer readable program code embodied therewith. The computer readable program code comprises computer readable program code configured to aggregate, for a web conference, metadata related to one or more participant electronic devices and a presenter electronic device that communicate with each other in the web conference; computer readable program code configured to determine a presentation parameter from the metadata; computer readable program code configured to generate, at a display screen of the presenter electronic device, a selection interface from the presentation parameter; computer readable program code configured to select a conference setting from the selection interface; and computer readable program code configured to display a set of content presented at the presenter electronic device and shared with the one or more participant devices according to the selected conference setting.

BRIEF DESCRIPTION OF THE SEVERAL VIEWS OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

In the following description, specific details are set forth although it should be appreciated by one of ordinary skill that the systems and methods can be practiced without at least some of the details. In some instances, known features or processes are not described in detail so as not to obscure the present invention.

The systems and methods permit a web conference presenter to share a screen which can be viewed by any and all attendees of the web conference, regardless of the disparity in display screen sizes or other factors. In particular, if an attendee misses an important part of a screen-shared presentation or other application, the systems and methods can maximize screen resolution for the user systems including compensating for system hardware or software configuration, connection speeds, and related variable factors. This can be achieved by aggregating the different display resolutions and displaying a heatmap or other selection interface to the presenter from the aggregation results. The presenter can select preferred settings for the conference from the heatmap. The heatmap can represent the user's display resolution, form factor, and connection speed. Accordingly, presenter-attendee screen resolutions, refresh rates, and the like can be achieved that accommodates all of the participant computers. For example, a presenter at a 1024×768 pixel display can select a presentation parameter that permits the content displayed at the presenter computer for display to a handheld device having a 160×100 pixel display. This can be achieved by presenter-selectable or automatic resizing of the content, changing the screen resolution, changing the refresh rate, and the like. The presenter actions can be limited to a viewable canvas. Accordingly, any or all conference participants can adequately view the content.

Figure 1:
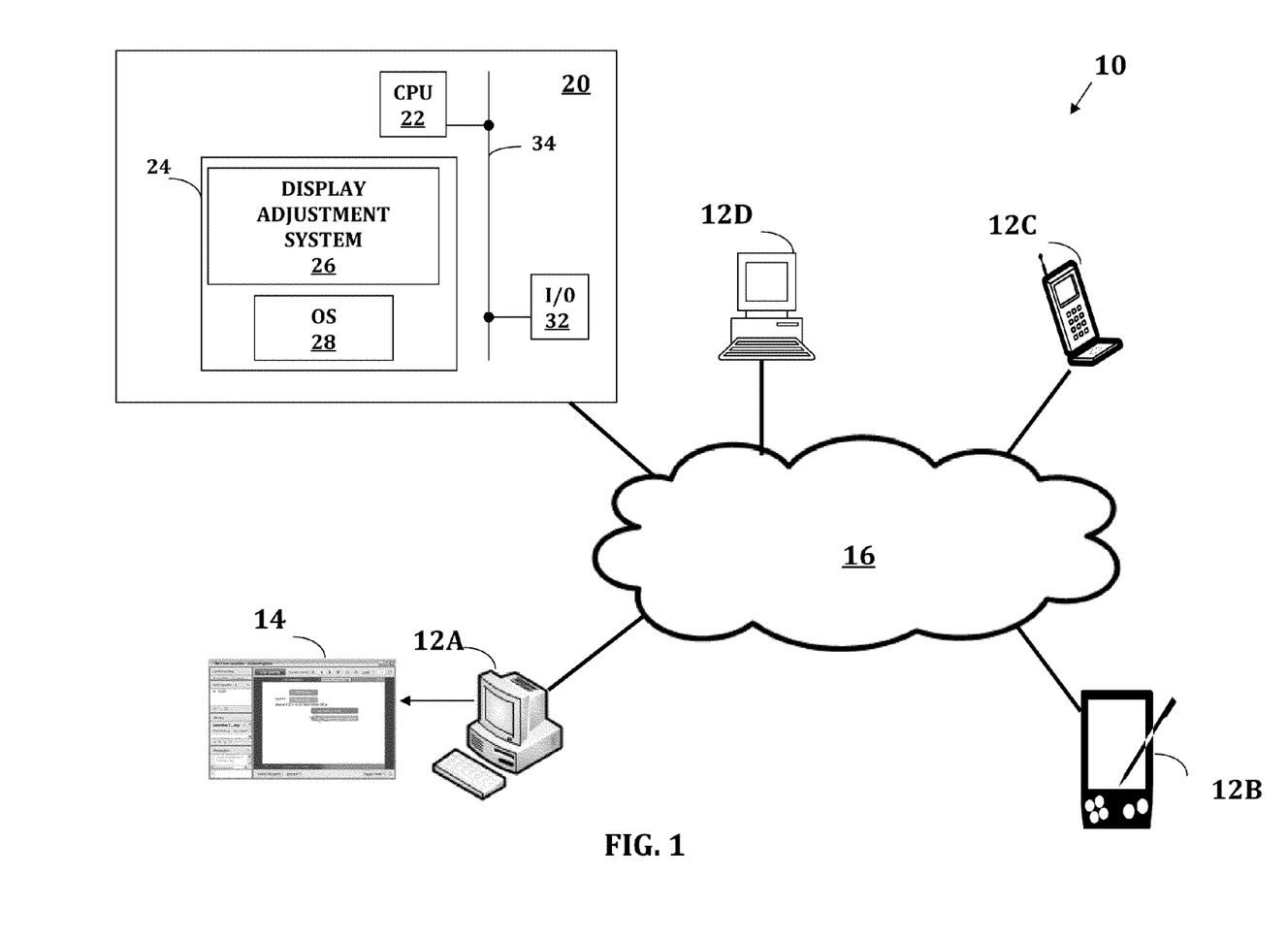
FIG. 1 is an illustration of a web conferencing environment in which embodiments of the present inventive concepts can be practiced.

FIG. 1 is an illustration of a web conferencing environment 10 in which embodiments of the present inventive concepts can be practiced.

The web conferencing environment 10 can be an online communication environment, or any electronic communication between two or more participants, including but not limited to emeetings, chat rooms, voice over IP conferencing, web conferencing, or other real-time or near real-time online communications. Such communications can include the exchange of messages or other data between users, screen-sharing content, online discussion forums or blogs, social networks, organization, or other environment where two or more users participate in an interactive exchange.

The web conferencing environment 10 includes participant computers 12A, 12B, 12C, 12D (generally, 12) in electronic communication with a meeting server 20 via a network 16. The meeting server 20 can be part of an online conferencing server, an email server, or related application server, or be in electronic communication with an online conferencing server, email server, or related application server via the network 16.

The participant computers 12 can be desktop computers, laptop computers, server systems, handheld devices such as personal digital assistants (PDA) or smartphones, computer terminals, or a combination thereof, or other electronic devices having a display screen that presents content such as text, graphics, and/or video to a viewer. For example, as shown in FIG. 1, participant computer 12A can be a desktop computer, participant computer 12B can be a smartphone, participant computer 12C can be a tablet device, and participant computer 12D can be a laptop computer. The participant computers 12A, 12B, 12C, 12D can have different display sizes, form factors, connection speeds, and/or other physical or electronic distinguishing features.

The participant computers 12 can be geographically separate from each other, and can communicate with the meeting server 20 via the network 16, for example, a public switched telephone network (PSTN), a mobile communications network, a data network, such as a local area network (LAN) or wide area network (WAN), or a combination thereof, or other communication networks known to those of ordinary skill in the art.

Participant computers 12 can join a conference, online session, and the like by registering with the meeting server 20, for example, logging into the meeting server 20, or selecting a prearranged link provided to the participant computers 12. The participant computers 12 can be configured with a screen sharing software application shown at a presenter display screen 14, or by using a screen sharing service to share a web browser or other displayed application. For example, participant computer 12A can share the contents of the display screen presented at participant computer 12A.

The meeting server 20 can include a processor such as a CPU 22, a memory 24, and an input/output (I/O) logic 32, for example, including a network interface card (NIC), which communicate with each other via a data/control bus and/or data connector, for example, a peripheral component interconnect (PCI) bus. The I/O logic 32 can include one or more adaptors for communicating with the network 16.

The memory 24 can include volatile memory, for example, random access memory (RAM) and the like, and/or non-volatile memory, for example, read-only memory (ROM), flash memory, and the like. The memory 24 can include removable and/or non-removable storage media implemented in accordance with methods and technologies known to those of ordinary skill in the art for storing data. Stored in the memory 24 can include program code, such as program code of an operating system (OS) 28 and an display adjustment system 26 executed by the processor 22.

In an embodiment, the display adjustment system 26 can aggregate different display resolutions of the different participant computers 12A, 12B, 12C, 12D and show the presenter at participant computer 12A a selection interface and permit the presenter to select an optimal display resolution. The selection interface can include a heatmap, a drop down list or other displayed list, or related interface. The selection interface can represent the user's display resolution, form factor, connection speed, or other data related to one or more of the participant computers 12. In an embodiment, the heatmap or other selection interface is not presented if no variation is determined between the participant computers 12.

Figure 2:
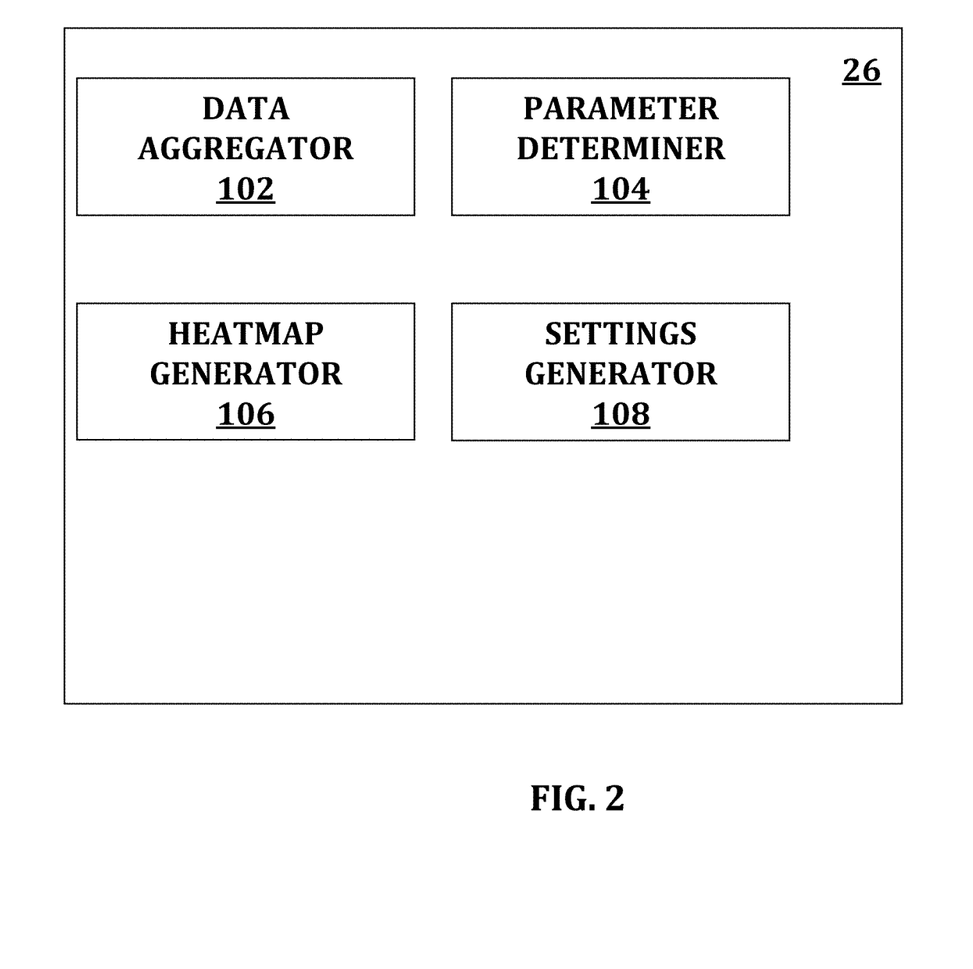
FIG. 2 is a block diagram of an display adjustment system, in accordance with an embodiment.

FIG. 2 is a block diagram of a display adjustment system 26, in accordance with an embodiment. The display adjustment system 26 can include a data aggregator 102, a parameter determiner 104, a heatmap generator 106, and a settings generator 108.

The data aggregator 102 can capture and process metadata related to properties, states, or physical data of each participant computer 12, for example, different screen size resolutions, form factors, and/or bandwidth information. Other examples can include data related to the location or type of device.

The metadata can be stored at the memory 24 or other storage device, for example, external data storage. The metadata can be stored for use with a prerecorded presentation and the like, or for future use when a user joins another conference or rejoins a current conference. The metadata can be stored for the duration of a web conference. For example, a participant computer 12 can disconnect from the web conference, save the metadata. The participant can subsequently rejoin the web conference. The participant computer screen can be resized or otherwise modified in accordance with the metadata when the participant computer 12 is rejoined.

The parameter determiner 104 can generate presentation parameters from the compilation of the aggregated data. The presentation parameters can include parameters that are optimal or adequate for each of the participant computers 12. The parameter determiner 104 can recalculate presentation parameters in real-time in response to changes to a web conference, for example, participants leaving or joining the web conference, changes to display settings or refresh rate, or variable factors such as bandwidth or CPU utilization.

The heatmap generator 106 can generate a heatmap at a display screen 14 of the presenter computer 12A from the aggregated data. In an embodiment, other graphical representations of data can be provided where the metadata can be represented in a graphical form, such as shades, colors, textures, patterns, and the like. The heatmap generator 106 can process a heatmap data structure generated from the aggregated data, and sort the heatmap data structure according to available screen real estate. For example, each section 404, 406, 408 can correspond to a different available screen resolution, which can be shown as a computation of different factors, available resolutions, and the like. The heatmap generator 106 can generate a plurality of heatmap control sections, each corresponding to a grouping of participants represented in the data structure. Participants can be grouped on like factors. Some participants can span multiple factors. The heatmap generator 106 can present a heatmap control to the presenter or moderator for selecting sections of the presenter's display screen for display to the other participant computers 12. The presenter can observe details on the participants in the grouping under the factors under which the participants are grouped.

The heatmap generator 106 can dynamically modify a displayed heatmap in response to the participant leaving or joining the web conference, or changes to a participant computer 12, such as display screen changes and so on.

The settings generator 108 permits a presenter 12A or other user to select a section of a display outlined by the heatmap so that the presenter 12A can take an action that modifies the manner in which the content on the presenter's display is shared with other participant computers 12. For example, the presenter 12A can select a display resolution that is conducive to the other participant computers 12B-12D. The settings generator 108 can reset the presenter's display resolution in response to the presenter 12A clicking on a desirable section based on the heatmap. The settings generator 108 can alternatively resize the presenter's content, for example, multimedia slides, so that they can be displayed in their entirety at the other participant computers 12, regardless of screen size.

In an embodiment where a portrait resolution is insufficient, but a landscape resolution. The display adjustment system 26 can automatically suggest a rotated screen for users unable to see the picture. For example, a portrait resolution may not be sufficient, but a landscape resolution may suffice. The presenter can select a preferred view, for example, section 406 shown in FIG. 5. The user can be notified of this change, and receive an automatic notification suggesting that one of the portrait mode and the landscape mode is preferable over the other of the portrait mode and the landscape mode.

The display adjustment system 26 can also implement a policy and/or administration feature, which controls access to embodiments of the present inventive concepts. For example, a policy system can be implemented to ignore mobile user concerns, or honor certain concerns over other concerns under a rules-based configuration.

Figure 3:
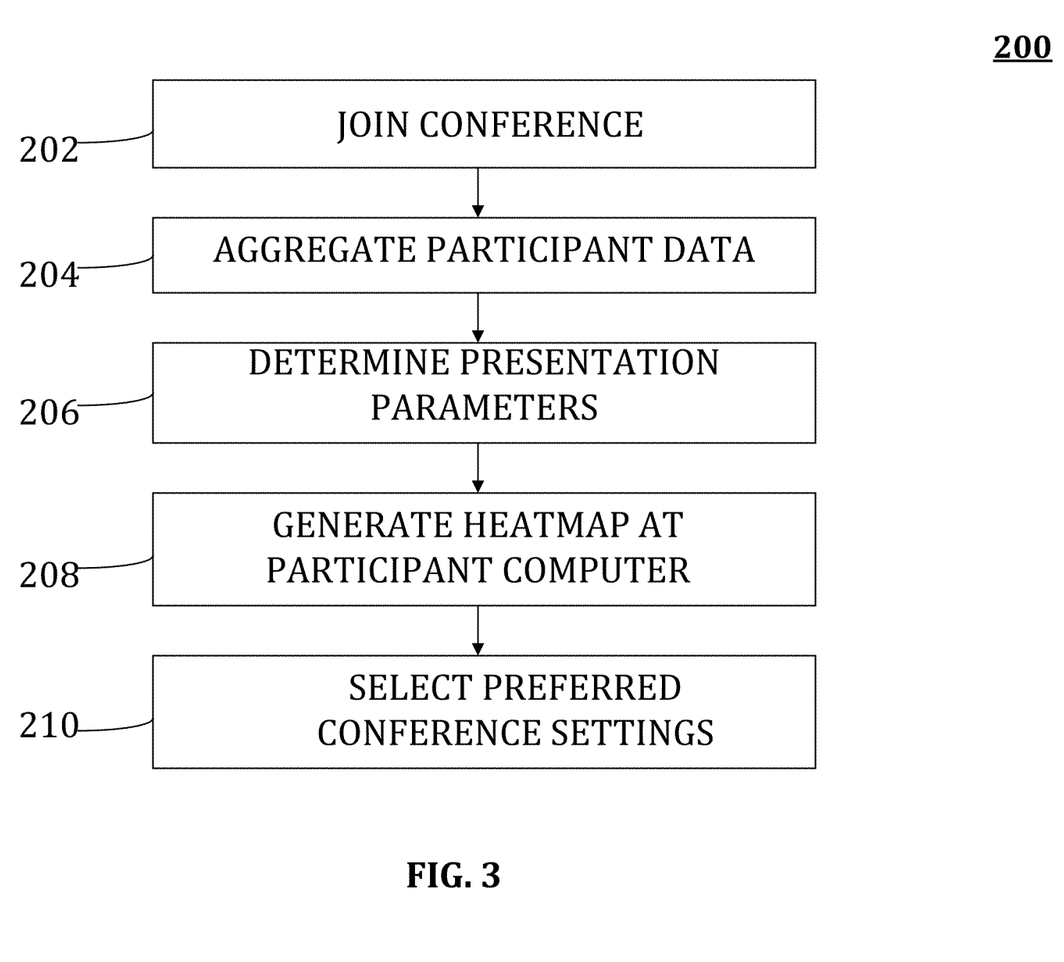
FIG. 3 is a flowchart of a method for presenting content to web conferencing participants, in accordance with an embodiment.

FIG. 3 is a flowchart of a method 200 for adjusting a display screen in an electronic meeting, in accordance with an embodiment, in accordance with an embodiment. In describing the method 200, reference is also made to FIGS. 1 and 2. Some or all of the method 200 can be performed on the display adjustment system 26.

At block 202, a plurality of participants, also referred to as attendees, can join an electronic meeting or other electronic communication between two or more participants, for example, a chat room, voice over IP conference, web conference, online discussion forum, or other environment where two or more users participate in an interactive exchange. Each participant can join the meeting via an electronic device, e.g., a computer 12, which establishes an electronic communication with the meeting server 20. At least one of the participants can be a presenter.

The presenter computer 12A can have predetermined display characteristics, for example, a screen size resolution of 1600×900 pixels. A first participant computer 12B, a second participant computer 12C, and a third participant computer 12D can have display screen sizes, connection speeds, and the like that are different than the presenter computer 12A. For example, the first participant computer 12B can have a screen size resolution of 700×280 pixels, and is connected to a conference via a mobile network. The second participant computer 12C can have a screen size resolution of 1024×768 pixels, and be connected to the conference via a mobile network. The third participant computer 12D can have a screen size resolution of 1600×1200 pixels.

At block 204, participant data can be captured and aggregated by the display adjustment system 26. The data can relate to one or more properties or states of each participant computer 12, for example, metadata corresponding to the different screen size resolutions, connection speeds, and/or form factors referred to at block 202. Additional parameters and/or metadata can be provided by the presenter computer 12A and/or the participant computers 12B-12D on a real-time basis, for example, if a connection speed is reduced or increased. The captured data can be stored at a memory device. In an embodiment, the system 26 can prompt a participant to select the amount of display space to be provided to the web conference. This can be beneficial where the content to be shared is running under a tab or tray, or running in the background, or covered by another application, or is out of a viewable range.

At block 206, optimal presentation parameters can be determined in response to the aggregated data. In an embodiment, the parameter determiner 104 can count the unique entries of metadata. For example, the parameter determiner 104 can determine that one display screen is configured for 160×100 pixels, or that a 16×9 display occurs twice, and/or that one participant device 12 is configured for and/or operating at a connection speed of 100 bps. The parameter determiner 104 can add unique data sets and counts of each received parameter to the heatmap generator 106, which can produce a heatmap data structure. The heatmap data structure can be arranged according to available display screen space, or "available screen real estate." The data structure can be a vector or array for performing quick computations from extracted data. The data can be provided from a browser, for example, HTTP client information, memory resident application, and so on. The data can be transferred into a preferred data structure. The data structure can run a frequent pattern program or a translator. Optimal display parameters can be determined by combining metadata such as screen resolution, form factor of the display screens, connection bandwidth, and so on obtained from each attendee.

Figure 5:
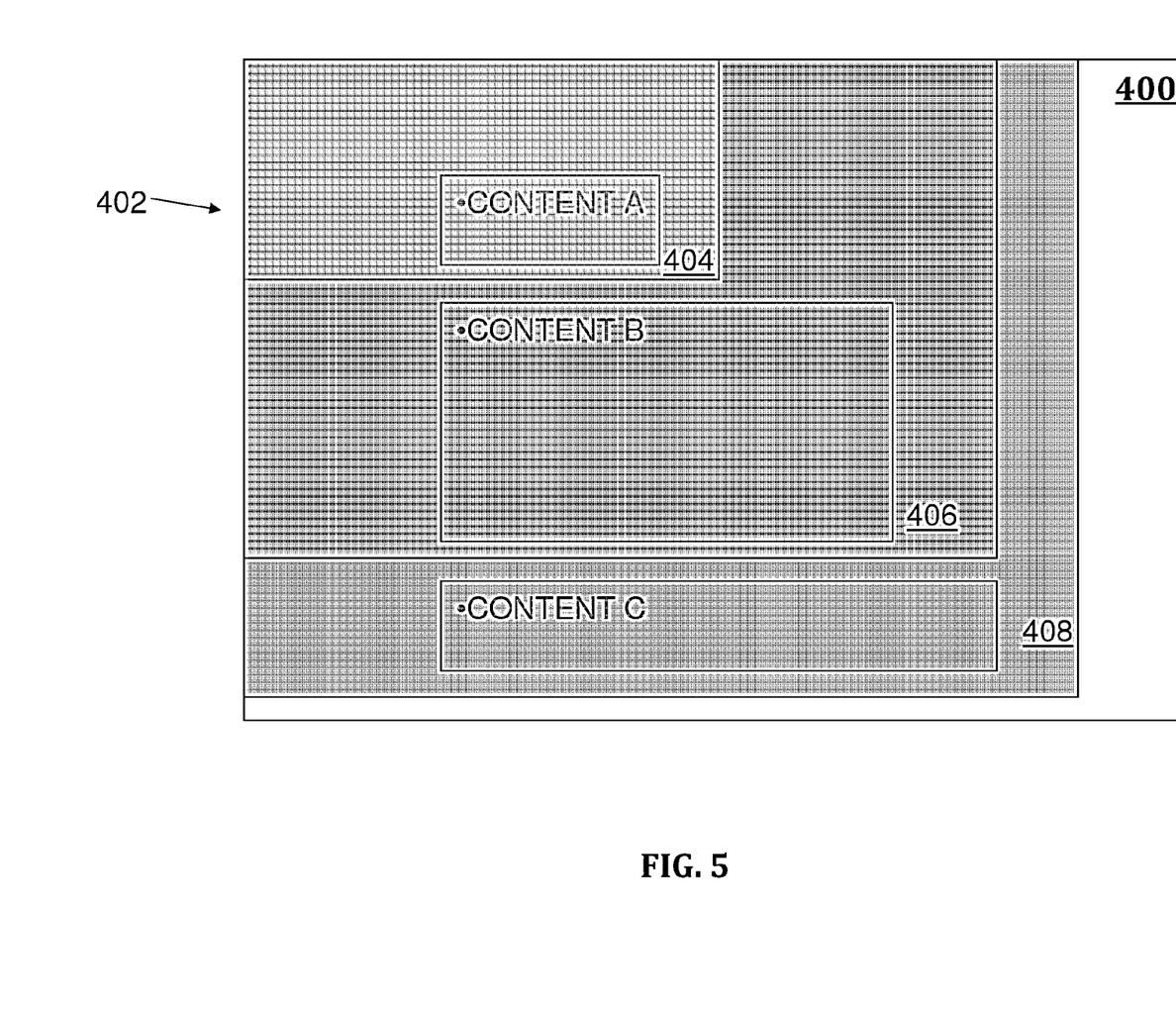
FIG. 5 is a diagram illustrating a presenter display, in accordance with an embodiment.

At block 208, the heatmap is generated for the presenter computer 12A. The heatmap can be generated so that each section in the heatmap corresponds to a group of attendees represented in the data structure, for example, where participants are grouped based on like factors. Each section, or grouping of the data structure, can be represented on the screen with a like width/height and aspect ratio. For example, if a presenter display is 160×100, then a 160×100 heatmap section, for example, 404 at FIG. 5, is displayed. Or if another display is 1600×1200, then another section that is 1600×1200 is displayed, for example, 406 at FIG. 5.

In an embodiment, the heatmap sections are overlaid, for example, shown in FIG. 5. The coincidence in the sections can add intensity for the coincidence for the view. For example, the common area of section 1 having an intensity value of 10 and section 2 having an intensity value of 5 can be displayed having a combined intensity value of 15, which is translated by the heatmap data structure to have a "darker" image, for example, comparing sections 404, 406, and 408 shown in FIG. 5.

If there are any differences in bandwidth, in the section or sets of sections, the settings generator 108 can produce a relative multiplier that is applied to generate the weight of the section, and thus the heatmap. For example, a weight can correspond to a preferred factor such as bandwidth. The display adjustment system 26 can also detect graphic intensive applications or web conferences, and the settings generator 108 can provide a multiplier to the heatmap region, or section, which is most impacted.

In an embodiment, the heatmap is constructed and arranged to remain viewable at all times to the presenter. In another embodiment, the heatmap is constructed and arranged to remain viewable for a predetermined time.

The heatmap may be updated as new users join the conference or leave the conference, as screen display real estate becomes available, or as parameters change, for example, bandwidth changes. In an embodiment, the heatmap is presented with borders. In another embodiment, the heatmap is presented with attendee lists or attendee data. The heatmap can be presented at predetermined actions, for example, drawing tools, annotation tools, polling, which can ensure that the actions are captured in a viewable canvas.

At block 210, the presenter can select the preferred settings for the conference in view of the heatmap. The presenter can click on the ideal section based on the heatmap. The display adjustment system 26 can reset the presenter's display resolution or reset the presenter's slide or other screen-shared application. The preferred settings can be further applied to other attendee computers, where they can properly see the web conference.

Figure 4:
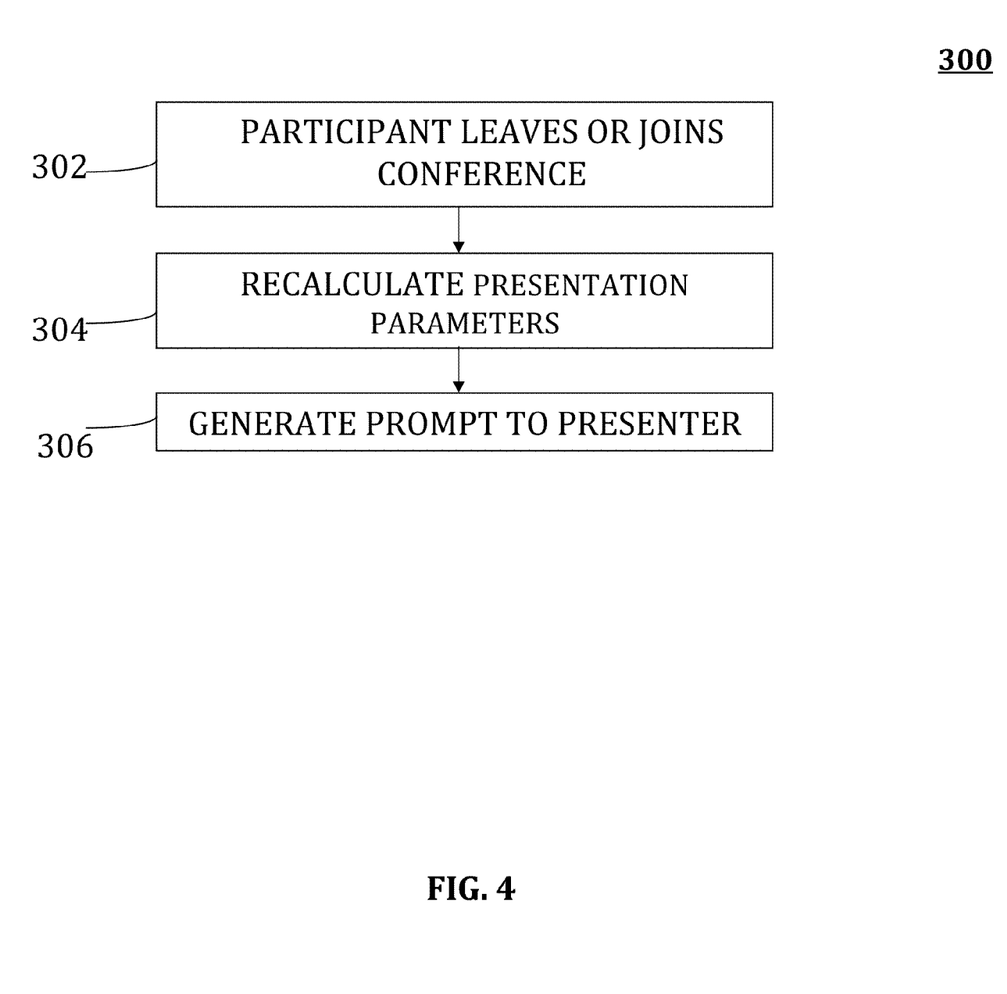
FIG. 4 is a flowchart of a method for adjusting a display screen in an electronic meeting, in accordance with an embodiment.

FIG. 4 is a flowchart of a method 300 for adjusting a display screen in an electronic meeting, in accordance with an embodiment. In describing the method 300, reference is also made to FIGS. 1-3. Some or all of the method 300 can be performed after the method 200 described at FIG. 3

At block 302, a participant leaves or joins a web conference. In another embodiment, a change is made to a participant computer 12, for example, a participant changes a display screen resolution or a bandwidth change occurs.

At block 304, the display adjustment system 26 can adjust the presentation parameters in accordance with the change made in the web conference, e.g., a participant leaving the conference.

At block 306, a prompt can be generated at the presenter computer 12A. The prompt can provide the presenter with an option of resizing then display, changing the refresh rate, and the like. Alternatively, such actions can be automatically performed with no presenter participation.

FIG. 5 is a diagram illustrating a presenter display 400, in accordance with an embodiment. A presenter or moderator can present some or all of the content displayed at the presenter display 400 to one or more other participants of a web conference or other electronic communication.

A heatmap 402 or other graphical representation is displayed. The heatmap 402 can include a plurality of sections 404, 406, 408. Each section 404, 406, 408 can correspond to a grouping of participants represented in a heatmap array, where values contained in the array are represented as different shades of gray, or different colors. In other words, the contents of the display screens can be symbolized, for example, colored, according to values generated from the metadata, for example, areas of the presenter display 400 that show high values appear red, whereas low values show blue.

For example, section 404 can correspond to participants having a 160×100 pixel display, section 404 can correspond to participants having a 1026×768 pixel display, and section 408 can correspond to participants having a 1600×900 display. Each section 404, 406, 408 can be represented at the presenter display 400 having a like width/height/aspect ratio.

The sections 404, 406, 408 can be overlaid on each other, which can show common areas between the sections 404, 406, 408. These common areas can be displayed having a higher intensity value than the individual sections. For example, section 406 can have an intensity value of 10, section 408 can have an intensity value of 5. The common viewing area between sections 406, and 408, i.e., the area of section 406 surrounding section 404, can show a combined intensity of 15, as indicated by the darker shading at section 406 than the shading at section 408.

The following example can be provided with reference to FIG. 5. In this example, 25% of the display screen at participant computer 12B can be provided to a screen sharing event. 75% at participant computer 12A can be provided to the screen sharing event. In each case, metadata is generated, and provided to the display adjustment system 26, that can correspond to content that is 25% viewable. Participant computer 12B can be a mobile device, such as a wireless computer or smartphone. Participant computer 12B can be directly connected to a local area network (LAN). Participant computer 12B resizes the available presentation area, for example, increases the amount of content for viewing. In this example, the optimal display common to both participant computers 12A, 12B is the intersection of additional metadata to the presenter from participant computer 12B as well as the current metadata corresponding to the current state of the participant computers 12A, 12B.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been shown and described with reference to specific embodiments, it should be understood by those skilled in the art that various changes in form and detail may be made therein without departing from the spirit and scope of the invention.

What is claimed is:

1. A display adjustment system, comprising:
   a data aggregator implemented in a processor that combines metadata and processes metadata related to data for a visual display at one or more participant electronic devices and a presenter electronic device that communicate with each other in a web conference;
   a parameter determiner implemented in a processor that determines a presentation parameter from an aggregation result of a compilation of the combined metadata, wherein the combined metadata includes additional non-visual metadata different from the metadata related to the data of the visual display, and wherein the combined metadata is provided to the presenter electronic device for selecting the display resolution;
   a selection interface generator implemented in a processor that generates a selection interface in response to the aggregation result for determining the presentation parameter, wherein the selection interface includes a heatmap presented from the aggregation result, wherein the heatmap includes at least two heatmap sections, including a first heatmap section displayed at a first intensity corresponding to first combined metadata related to a first participant electronic device and a second heatmap section displayed at a second intensity overlaid on the first heatmap section and corresponding to second combined metadata related to a second participant electronic device, wherein the second heatmap section overlaid on the first heatmap section form a common area that show a combined intensity of the first intensity with the second intensity, and wherein the selection interface permits the area outlined by each heatmap section to be selected; and
   a settings generator implemented in a processor that provides a conference setting that can be activated responsive to the selection interface receiving a selection in one of the areas outlined by one of the heatmap sections.

2. The display adjustment system of claim 1, wherein the parameter determiner recalculates the presentation parameter in response to a participant of the one or more participant electronic devices leaving or joining the web conference.

3. The display adjustment system of claim 2, wherein the selection interface generator modifies the selection interface in response to the participant leaving or joining the web conference.

4. A computer program product, comprising:
   a non-transitory computer readable storage medium having computer readable program code embodied therewith, the computer readable program code comprising:
   computer readable program code configured to aggregate, for a web conference, metadata related to data for a visual display at one or more participant electronic devices and a presenter electronic device that communicate with each other in the web conference that includes the visual display;
   computer readable program code configured to determine a presentation parameter from the metadata, the presentation parameter determined from an aggregation result of a compilation of the combined metadata, wherein the combined metadata includes additional non-visual metadata different from the metadata related to the data of the visual display, and wherein the combined metadata is provided to the presenter electronic device for selecting the display resolution;
   computer readable program code configured to generate, at a display screen of the presenter electronic device, a selection interface from the presentation parameter, wherein the selection interface includes a heatmap presented from the aggregation result, wherein the heatmap includes at least two heatmap sections, including a first heatmap section displayed at a first intensity corresponding to first combined metadata related to a first participant electronic device and a second heatmap section displayed at a second intensity overlaid on the first heatmap section and corresponding to second combined metadata related to a second participant electronic device, wherein the second heatmap section overlaid on the first heatmap section form a common area that show a combined intensity of the first intensity with the second intensity, and wherein the selection interface permits the area outlined by each heatmap section to be selected;

computer readable program code configured to activate a conference setting responsive to receiving a selection from the selection interface; and computer readable program code configured to display a set of content presented at the presenter electronic device and shared with the one or more participant devices according to the selected conference setting.

5. The display adjustment system of claim 1, wherein the metadata relates to at least one of a bandwidth, a screen resolution, and a form factor of a display screen of at least one of the one or more participant electronic devices.

6. The display adjustment system of claim 1, further comprising a heatmap generator that dynamically modifies the displayed heatmap.

7. The display adjustment system of claim 1, wherein the selection interface includes a plurality of sections, each section arranged on the display screen of the presenter electronic device according to a common feature of the one or more participant electronic devices.

8. The display adjustment system of claim 1, wherein the metadata related to the data of the visual display includes screen resolution data, and wherein the additional metadata includes at least one of a bandwidth and a form factor of a display screen of at least one of the participant electronic devices.

* * * * *